Aug. 2, 1949.  C. J. GLANZER  2,478,097
FILTER
Filed April 7, 1944  2 Sheets-Sheet 1

INVENTOR
Clarence J. Glanzer
BY
Hyde and Meyer
ATTORNEYS

Aug. 2, 1949.   C. J. GLANZER   2,478,097
FILTER
Filed April 7, 1944   2 Sheets-Sheet 2

INVENTOR
Clarence J. Glanzer
BY
Hyde and Meyer
ATTORNEYS

Patented Aug. 2, 1949

2,478,097

UNITED STATES PATENT OFFICE 2,478,097

FILTER

Clarence J. Glanzer, Northfield, Ohio, assignor to Air-Maze Corporation, Cleveland, Ohio, a corporation of Delaware Application April 7, 1944, Serial No. 529,925

4 Claims. (Cl. 183—74)

This invention relates to improvements in filters such as are used for the removal of dust and foreign particles from streams of air and gas.

This application is a continuation in part of my abandoned application Serial Number 441,067, filed April 30, 1942.

An object of the present invention is to provide a filter utilizing a woven screen wherein the individual wires of the screen are completely covered with cloth the fibers of which extend into the screen openings. The objects and advantages of this invention will be more clearly described in the accompanying specification and drawings and the essential features will be summarized in the claims.

Figure 1:
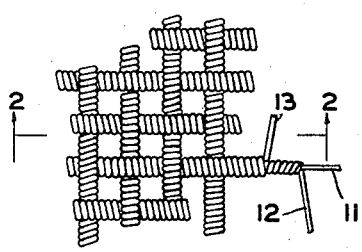
Figure 2:
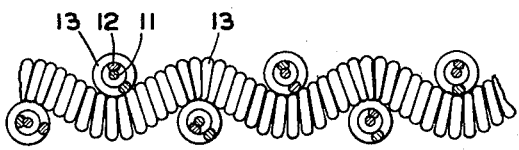
Figure 3:
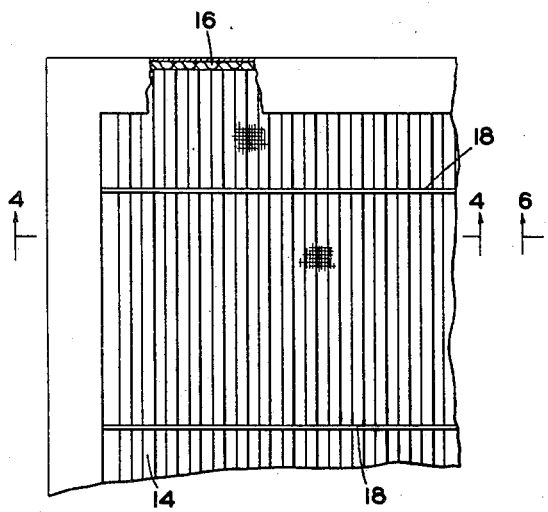
Figure 5:
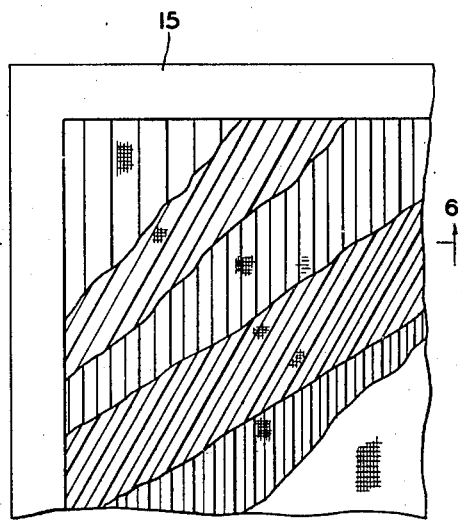
Figure 4:
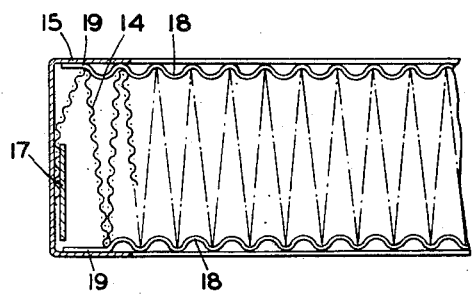
Figure 6:
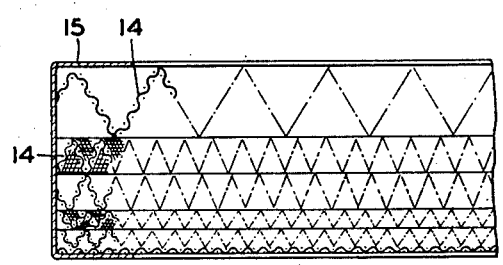
Figure 7:
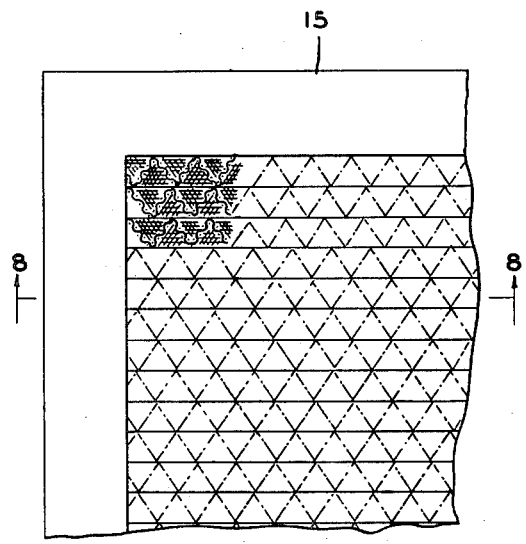
Figure 9:
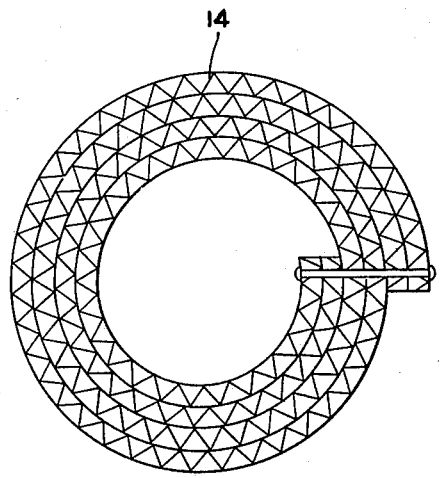
Figure 8:
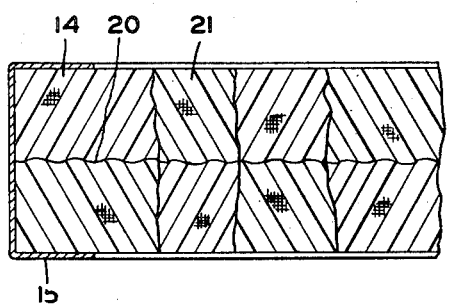
Figure 10:
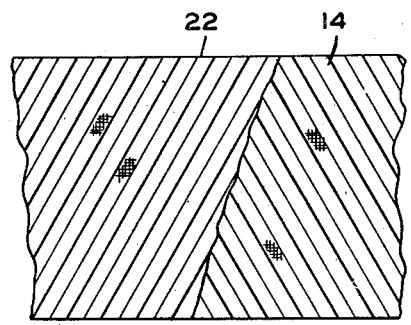
Figure 11:
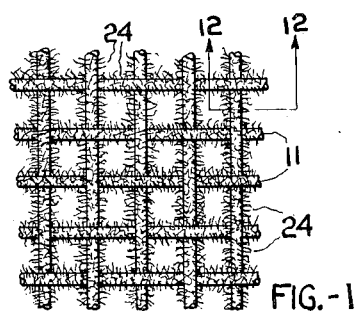
Figure 12:
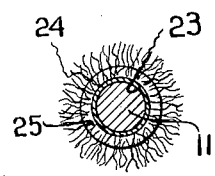

In the drawings, Fig. 1 is a fragmental view of a portion of the filter screen very greatly enlarged; Fig. 2 is a sectional view greatly enlarged taken along the line 2—2 of Fig. 1; Fig. 3 is a fragmental front elevational view of one form of filter utilizing my improved screen; Fig. 4 is a sectional view taken along the line 4—4 of Fig. 3; Fig. 5 is a fragmental front elevational view of another form of filter with screen layers broken away; Fig. 6 is a sectional view taken along the line 6—6 of Fig. 5; Fig. 7 is a fragmental front elevational view of another form of filter; Fig. 8 is a sectional view taken along the line 8—8 of Fig. 7; Fig. 9 is a top plan view of a cylindrical form of filter; Fig. 10 is a developed view of a portion of the filter of Fig. 9 partly broken away to more clearly show the construction; Fig. 11 shows a modification and is a portion of filter screen greatly enlarged; and Fig. 12 is a cross-sectional view of a single wire of Fig. 11 enlarged.

Many filters have been constructed using a woven mesh either of wire alone or of cloth alone, but these have had many disadvantages which are overcome by my improved combination of wire and cloth or absorbent fiber in the same mesh fabric.

Filters composed of cloth fabric alone have been unsatisfactory for continued use requiring intermittent cleaning because the cloth loses its shape and quickly wears out when subjected to hard treatment and frequent cleanings.

Prior filters have been made of plain wire mesh but these have had the disadvantage that the dust or other foreign particles in the filter stream did not adhere readily to the wires and if an oil coating was used on the wires difficulty was encountered in maintaining an oil film of the proper thickness, especially when the screen was stored or otherwise remained unused for a period of time. Also great difficulty was encountered in getting a proper recoating of wire screens with oil when this work was done by relatively unskilled labor as was usually the case.

My improved filter therefore overcomes all of these objections found in the prior devices and provides a woven mesh fabric which easily retains particles of dust and other foreign material passing through the filter, which is sturdy enough to withstand rough usage and many cleanings, and if a coating of oil is used my device will retain a large reservoir of oil evenly distributed throughout the mesh which is the desired condition for maximum efficiency.

Also in the oil coated form of my device unskilled labor can recoat the filter with oil so that it will be just as efficient as if the coating had been done in the factory under the most skilled supervision.

My improved filter is formed of a mesh woven in any usual fashion, such as the portion of screen shown in Figs. 1 and 2. The base of the screen is the wire 11 around which a cloth covering is formed as in Figs. 1 and 2 by tightly wrapping a cloth or fiber thread 12. If desired a second thread 13 may be wrapped outside the thread 12 and if this second thread is wrapped in the opposite direction from the thread 12 it provides a structure which is worn down or torn apart with great difficulty. The sectional view of Fig. 2 is greatly enlarged so as to emphasize the position of the wire core 11 and the wrappings 12 and 13.

Obviously the wire used and the open spaces between the meshes will be chosen according to the duty to be performed. I find, however, that an air filter capable of wide use may be provided where the wire 11 is of approximately 22 gauge and the two wrappings make the total outside diameter of the covered wire not more than about $\frac{1}{64}$" so that when the wire is woven into screen form with twenty wires to the inch, the clear openings or interstices between the wires are approximately $\frac{1}{32}$" square.

If the screen is to be coated with oil or other dust adhesive, then obviously the threads 12 and 13 should be of material adapted to absorb oil or other dust adhesive. I have found that a cotton thread is very satisfactory for this purpose and will stand hard usage and frequent cleanings.

A screen when constructed as described above may be formed into filters of many forms, four of which are disclosed herewith. It will be understood, however, that I do not limit myself to any specific form of filter so long as it utilizes the novel screen previously described.

In Figs. 3 and 4, I have shown a screen 14 which is woven of the wrapped wire previously described and formed in a continuous zigzag as best seen in Fig. 4. A frame 15 open at the front and rear surrounds the screen unit. The open ends at top and bottom are imbedded in a felt sealing strip 16 so as to prevent fluid leakage at this point. The ends of the zigzag form are held tightly against the frame 15 by continuous strips 17 running from top to bottom of the filter unit. These strips may be spot welded or otherwise secured in place. The various folds of the zigzag screen may be retained in proper position by corrugated wire spacing members 18 which are secured to the frame 15 at the points 19.

Another form of filter is shown in Figs. 5 and 6 where the screen 14 is formed in corrugated layers of varying depth with the corrugations of adjacent layers crossing each other at an angle as best seen in Fig. 5, so as to maintain the proper spacing of the layers. Here again a frame 15 houses the filter unit. Obviously the screens of the various layers shown in Figs. 5 and 6 might be of different mesh if desired.

In Figs. 7 and 8 is shown still another form of filter constructed from the improved screen 14. In this form the screen has been crimped in herringbone fashion as best seen in Fig. 8, it being understood that each layer is a continuous piece of screen from front to rear of the frame 15 as shown in Fig. 8, with the corrugations in the front half of the screen staggered relative to the corrugations in the rear half thereof. In other words the line 20 is not a line of separation but merely indicates the slight folding of the screen due to the staggering of the corrugations. The next adjacent layer shown at 21 has the herringbone crimpings extending in a direction toward the right as distinguished from the left-hand direction of the crimps first described. Thus, alternate layers have the herringbone crimp extending in opposite directions so as to properly space the screens.

In Fig. 9, I have shown how my improved screen may be utilized to form the cylindrical type screen of United States Patent No. 2,190,683 granted February 20, 1940, to A. E. Schaaf et al. Here the screen 14 is first crimped in parallel corrugations extending at an angle to the parallel edges of the strip and the strip is then folded over along the line 22 so as to place the corrugations in the two layers at an angular relation to each other. Such a strip is then rolled as indicated in Fig. 9 to give a substantially cylindrical form filter.

Any or all of these filters, or others constructed of my improved screen may be coated with oil if desired so as to better provide a filter acting upon the impingement principle. In this case it is only necessary to dip the screen into any suitable oil, after which the excess oil may be drained off. The cloth covering provided by the threads 12 and 13 will absorb a great quantity of this oil and will hold it for long periods of time without deterioration. When these screens get dirty they may be cleaned in any suitable solvent or detergent and again coated with oil which restores them to practically their original efficiency. The wire core holds the mesh in its exact predetermined position and the threads 12 and 13 are not easily destroyed when they are tightly wrapped upon the wire core.

When a plain wire screen is coated with oil to provide a filter acting on the impingement principle, if a light oil is used it will drain away if the filter is stored or unused for a period of time. Therefore it is customary to put a special heavy coating of oil on the wire when such screens are first formed at the factory. When these screens are recoated after cleaning, care must be taken that the heavy coating of oil is not entirely removed or if so that it is replaced with a similar coating. It is difficult to control these matters in actual practice because unskilled labor is generally used for these operations. My present filter overcomes any such difficulties.

Another manner of securing a thread or cloth covering closely about the wire 11 is by braiding. This provides a similar structure where the wire core gives a sturdy base and the fiber threads are so firmly wrapped about the wire and interlaced with each other that they are not easily damaged or removed from the wire base.

Another manner of securing a cloth or fiber covering closely about the wiring 11 is illustrated in Figs. 11 and 12. Here the wires 11 are first coated with an adhesive which is shown very greatly exaggerated in Fig. 12 as providing the layer 23. On this is blown or shaken a multiplicity of short fibers 24 of cotton or other suitable fiber in sufficient quanity to provide a complete layer 25 completely surrounding all of the wires 11. This covering is shown in greatly exaggerated thickness in Fig. 12. This construction is very similar to that shown in Figs. 1 and 2. There is a layer of oiled absorbent fibrous material completely surrounding each wire of the screen mesh, and fibrous tendrils extend into the openings of the mesh structure. The cloth wrappings 12 and 13 of Figs. 1 and 2 have these fibrous tendrils but to a lesser degree than the structure shown in Figs. 11 and 12. In fact, they are so fine in the structure of Figs. 1 and 2 that they are difficult to see with the naked eye unless a light is placed behind the screen mesh.

It results from this construction either as shown in Figs. 1 and 2 or in the modification of Figs. 11 and 12 that a substantial reservoir of oil (or other dust-adhesive liquid) is stored in the layer of fiber which completely surrounds the screen wires 11. This oil works out along the fibrous tendrils thus providing numerous places where small dust particles may be caught on the oil-coated fibers. The device in either modification may be washed to remove the dust particles at which time the wires 11 forming the core of the screen mesh hold their fixed position so that the mesh structure is not destroyed and retains permanently the fixed spacing of the wires 11 which is necessary if an exact filtering media is to be provided.

My improved filter has advantages in cleaning efficiency and saving of weight which makes it particularly adapted for airplane use. The old type filter made of plain wire coated with oil is unsatisfactory for airplane use because it requires so much material that it adds additional weight which is undesirable. One layer of screen of my improved type will filter the air as clean as was possible in the old type with 20 layers of slightly larger mesh oil-coated bare wire. This saves a great deal of weight. At the same time my improved filter is adapted to handle and to clean air at the very high velocities encountered in modern fighting planes in a most efficient manner.

What I claim is:

1. An air filter of the type in which solid particles of dust and the like are separated from an air stream by impingement upon a screen mesh which is coated with a dust-catching liquid, comprising a screen of filaments of hard durable material woven in a mesh of fixed opening sizes adapted to withstand handling and pulling without substantial variation of said opening sizes, a layer of fibrous material adapted to absorb dust-catching liquid forming a liquid reservoir completely covering and firmly secured to each filament of said screen leaving the interstices between said filaments substantially open for the passage of the air to be filtered, fibrous tendrils of said fibrous material being self-supported on said filaments and extending into said interstices, said fibrous tendrils being of firmly woven material adapted to withstand, without breaking, an air stream of high velocity, and dust-catching liquid held by said fibrous material and tendrils, whereby an air stream may pass through said interstices of said screen with very low resistance, a large area of fibrous material and tendrils is exposed to impingement of solid particles, the dust-catching liquid is continuously supplied from said reservoir to said tendrils and to the dust particles caught thereon, and said filter may be washed free of dust and re-coated with liquid while retaining the predetermined fixed opening sizes of said screen mesh, and the hard durable filaments firmly supporting said layer of fibrous material during such washing.

2. A filtering medium comprising a wire mesh substantially entirely coated with a pile of flocking material.

3. A filtering medium comprising a woven wire mesh substantially entirely covered on both sides with a pile of flocking material adhering to the wires of the mesh.

4. A filter comprising a sheet of wire screening having a covering of flocking material secured to the wires of the screening, the fibers of the cover extending over and partially closing the interstices of the wire.

CLARENCE J. GLANZER.

REFERENCES CITED

The following references are of record in the file of this patent:

UNITED STATES PATENTS

| Number | Name | Date |
|---|---|---|
| 741,210 | Young | Oct. 13, 1903 |
| 1,056,722 | Adler | Mar. 18, 1913 |
| 1,774,232 | Hartwell | Aug. 26, 1930 |
| 1,898,027 | Winslow | Feb. 21, 1933 |

FOREIGN PATENTS

| Number | Country | Date |
|---|---|---|
| 148,795 | Great Britain | May 12, 1921 |
| 358,609 | Great Britain | Oct. 15, 1931 |